US011498868B2

(12) United States Patent
Wetherell et al.

(10) Patent No.: US 11,498,868 B2
(45) Date of Patent: Nov. 15, 2022

(54) ADDITION OF COLLOIDAL SILICA TO CONCRETE

(71) Applicants: MULTIQUIP, INC., Carson, CA (US); ARRIS TECHNOLOGIES, LLC, Orem, UT (US)

(72) Inventors: Mark Wetherell, Henderson, NV (US); Timothy J. Fanello, Mansfield, OH (US); Benjamin Wiese, Boise, ID (US)

(73) Assignees: MULTIQUIP, INC., Cypress, CA (US); ADHESIVES TECHNOLOGY CORPORATION, Pompano Beach, FL (US)

( * ) Notice: Subject to any disclaimer, the term of this patent is extended or adjusted under 35 U.S.C. 154(b) by 0 days.

(21) Appl. No.: 14/596,943

(22) Filed: Jan. 14, 2015

(65) Prior Publication Data
US 2015/0299041 A1 Oct. 22, 2015

Related U.S. Application Data

(60) Provisional application No. 61/929,010, filed on Jan. 17, 2014.

(51) Int. Cl.
*C04B 14/06* (2006.01)
*C04B 28/04* (2006.01)
*B28C 5/00* (2006.01)
*B28C 7/04* (2006.01)
*C04B 40/00* (2006.01)

(52) U.S. Cl.
CPC ............ *C04B 14/062* (2013.01); *B28C 5/003* (2013.01); *B28C 7/04* (2013.01); *C04B 28/04* (2013.01); *C04B 40/0028* (2013.01)

(58) Field of Classification Search
CPC ... C04B 14/062; C04B 28/04; C04B 40/0028; C04B 40/0032; B28C 5/003; B28C 7/04
See application file for complete search history.

(56) References Cited

U.S. PATENT DOCUMENTS

| 3,976,497 | A | | 8/1976 | Clark |
| 4,144,074 | A | | 3/1979 | Itoh et al. |
| 4,273,813 | A | | 6/1981 | Meddaugh |
| 4,330,446 | A | | 5/1982 | Miyosawa |
| 5,149,370 | A | * | 9/1992 | Olaussen ............... C04B 14/062 106/713 |
| 5,370,919 | A | | 12/1994 | Fieuws et al. |
| 5,431,852 | A | | 7/1995 | Kaijou |
| 5,584,921 | A | | 12/1996 | Wagner et al. |
| 5,895,688 | A | | 4/1999 | Bertoncini et al. |
| 5,932,000 | A | | 8/1999 | Bergqvist et al. |
| 5,945,169 | A | | 8/1999 | Netti et al. |
| 6,155,907 | A | | 12/2000 | Jones |
| 6,187,851 | B1 | | 2/2001 | Netti et al. |
| 6,454,632 | B1 | | 9/2002 | Jones et al. |
| 6,800,130 | B2 | | 10/2004 | Greenwood et al. |
| 7,608,143 | B2 | | 10/2009 | Brown |
| 7,732,497 | B2 | | 4/2010 | Cumberland et al. |
| 7,737,195 | B2 | | 6/2010 | Gimvang |
| 8,092,588 | B2 | | 1/2012 | Bowers |
| 8,999,056 | B1 | | 4/2015 | Hills et al. |
| 9,272,591 | B2 | | 3/2016 | Hills et al. |
| 2006/0178463 | A1 | | 8/2006 | Sacks |
| 2007/0129478 | A1 | | 6/2007 | Nakamura et al. |
| 2007/0201302 | A1 | | 8/2007 | Lindley |
| 2007/0266906 | A1 | | 11/2007 | Garcia |
| 2008/0081217 | A1 | * | 4/2008 | Bowers .................... C04B 28/24 428/703 |
| 2008/0261024 | A1 | | 10/2008 | Xenopoulos et al. |
| 2009/0050018 | A1 | | 2/2009 | Kishimoto |
| 2009/0110834 | A1 | | 4/2009 | Gimvang |
| 2009/0071377 | A1 | | 5/2009 | Wohrmeyer et al. |
| 2009/0142604 | A1 | | 6/2009 | Imai et al. |
| 2009/0169750 | A1 | | 7/2009 | Wilkins et al. |
| 2010/0095871 | A1 | * | 4/2010 | Patil ....................... C04B 14/303 106/692 |
| 2010/0324173 | A1 | * | 12/2010 | Fischer ................. C04B 14/062 523/351 |
| 2011/0111216 | A1 | | 5/2011 | Bowers |
| 2013/0281577 | A1 | * | 10/2013 | Chen ................... C04B 40/0039 524/5 |

FOREIGN PATENT DOCUMENTS

| DE | 2510224 A1 | 9/1975 |
| DE | 4041828 A1 | 7/1992 |
| DE | 102006049524 A1 | 4/2008 |
| EP | 0519155 A2 | 12/1992 |
| EP | 0736501 A1 | 10/1996 |

(Continued)

OTHER PUBLICATIONS

US 8,852,331 B2, 10/2014, Hills et al. (withdrawn)
"Modes of Transportation". PSU. Sep. 10, 2006. Retrieved from https://web.archive.org/web/20060910001517/http://www.engr.psu.edu/ce/courses/ce584/concrete/library/construction/mixingtransport/Modes%20of%20Transportation.htm.*
"Equipment Operator, Advanced". U.S. Navy. 1993. Retrieved from https://navytribe.files.wordpress.com/2015/11/navedtra-14080.pdf.*
Cheng, Fu Tung. "Concrete Countertops: Design, FOrms, and Finishes for the New Kitchen and Bath". 2003. pp. 119-121.*
Christine Beall, Complete Construction , Real Answers Contractors Need Masonry and Concrete. 2001. p. 42.
J. Ralph Dalzell, B.S. of A. Concrete Block Construction for Home and Farm. 1957. p. 16.

(Continued)

*Primary Examiner* — Shuangyi Abu Ali
(74) *Attorney, Agent, or Firm* — Burdick Patents, P.A.; Sean Burdick

(57) ABSTRACT

A method of blending concrete is provided wherein there is a determination of a standard volume of water to add to a dry concrete mix to provide hydrated concrete with a desired slump value, and then calculating a substitution volume of an aqueous composition including colloidal silica to be used in place of an eliminated portion of the standard volume of the water, and mixing the substitution volume of the aqueous composition with the concrete mix.

17 Claims, No Drawings

(56) References Cited

FOREIGN PATENT DOCUMENTS

| EP | 1176124 A1 | 1/2002 |
|----|------------|--------|
| EP | 1683768 A1 | 7/2006 |
| EP | 1749803 A1 | 2/2007 |
| JP | 2004314328 A | 11/2004 |
| JP | 2006290739 A | 10/2006 |
| JP | 2012171804 A | 9/2012 |
| WO | 9812149 A1 | 3/1998 |
| WO | 0190024 A1 | 11/2001 |
| WO | 0198210 A1 | 12/2001 |

OTHER PUBLICATIONS

Jorge-Peter Wagner et al: "Nanosilica-ein Zusatz fur dauerhaften Beton", Wissenschaftliche Zeitschrift/Hochschule Fur Architektur Und Bauwesen, Hochschule Fur Architektur Und Bauwesen, DE, vol. 40, No. 5/6/7, Jan. 1, 1994 (Jan. 1, 1994), pp. 183-187, XP008185698, ISSN: 0509-9773.
Robert O. Parmley, PE. Field Engineer's Manual Third Edition, 1963. p. 5.25.
Sherwin-Williams Material Safety Data Sheet, May 27, 2007.

\* cited by examiner

ADDITION OF COLLOIDAL SILICA TO CONCRETE

This application claims the benefit of U.S. Provisional Application No. 61/929,010, filed Jan. 17, 2014, and those portions of its disclosure which are not inconsistent with the disclosures of the present invention are incorporated herein by reference.

TECHNICAL FIELD

The present disclosure relates to the addition of colloidal silica as an admixture to concrete as it is being mixed, and prior to being poured or alternatively immediately after being poured.

BACKGROUND

Silica, silicates and siliconates have been used extensively for many different applications since their discovery. They are used in everything from toothpaste as an abrasive, to matches as a water proofer, to engine blocks as a sealant. Silica is the common name for silicon dioxide. Silica is one of two principle ingredients in Portland cement. Silica (in the form of siliceous clay) also known as a pozzolan, is mixed with limestone (calcium carbonate) under high heat to make cement.

The term pozzolan is derived from the name of the town Pozzuoli, Italy. It is situated near Mt. Vesuvius and is the place where the Romans more than 2,000 years ago mined the ashes deposited by the occasional eruptions of this volcano. Adding these ashes at a ratio of 2:1 to aged lime putty (aged 2+ years) they were able to construct the buildings of ancient Rome, many of which still exist today due to the composition of the concrete the Romans used.

The pozzolanic reaction is the chemical reaction that occurs in Portland cement containing pozzolans. It is the main reaction involved in the Roman concrete invented in Ancient Rome and used to build, for example, the Pantheon. Pozzolans are the glue that holds concrete together. Included within the category of pozzolans is colloidal silica. Colloidal silica is a suspension of fine amorphous, nonporous, and typically spherical silica particles in a liquid phase. Colloidal silica has an extremely high pozzolanic value. The smaller the particle size the larger the surface area and the higher the pozzolanic value.

At the basis of the pozzolanic reaction stands a simple acid-base reaction between calcium hydroxide, also known as Portlandite, or ($Ca(OH)_2$), and silicic acid ($H_4SiO_4$, or $Si(OH)_4$). Simply, this reaction can be schematically represented as follows:

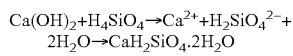

$$Ca(OH)_2 + H_4SiO_4 \rightarrow Ca^{2+} + H_2SiO_4^{2-} + 2H_2O \rightarrow CaH_2SiO_4 \cdot 2H_2O$$

or summarized in abbreviated notation of cement chemists:

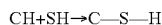

$$CH + SH \rightarrow C-S-H$$

The product of general formula ($CaH_2SiO_4 \cdot 2H_2O$) formed is a calcium silicate hydrate, also abbreviated as C—S—H in cement chemist notation, the hyphenation denotes the variable stoichiometry. The ratio Ca/Si, or C/S, and the number of water molecules can vary and the above mentioned stoichiometry may differ.

Many pozzolans contain aluminate, or $Al(OH)_4^-$, that will react with calcium hydroxide and water to form calcium aluminate hydrates such as $C_4AH_{13}$, $C_3AH_6$ or hydrogarnet, or in combination with silica $C_2ASH_8$ or stratlingite (where "C" represents calcium oxide, or lime (CaO), "A" represents aluminum oxide, or alumina ($Al_2O_3$), "S" represents silicon dioxide, or silica ($SiO_2$) and "H" represents water ($H_2O$) in cement chemist notation). In the presence of anionic groups such as sulphate, carbonate or chlorine, AFm (alumina, ferric oxide, monosulfate) phases and AFt (alumina, ferric oxide, tri-sulfate) phases or ettringite phases can form. Pozzolans not only strengthen and seal the concrete; they have many other beneficial features when added to the mix. The most common pozzolans are fly ash, rice hull ash, and silica fume.

Fly ash (FA) and rice hull ash (RHA) particles are almost totally spherical in shape, allowing them to flow and blend freely in mixtures with Portland cement. This is known as the "ball-bearing" effect of the spherical shape of FA and RHA particles create a lubricating action when concrete is in its plastic state.

During curing and continuing for some time thereafter these pozzolans will continue to combine with free lime, increasing the density and structural strength of the concrete over time. The increased density and long-term pozzolanic action ties up free lime and results in fewer bleed channels and decreases permeability in the concrete structure.

Dense pozzolan concrete also helps keep foreign, destructive compounds on the surface of the concrete where their destructive action is lessened. Pozzolan concrete is also more resistant to attack by sulfate, mild acid, soft (lime-absorbing) water, and seawater. These pozzolans tie up free lime that otherwise could combine with sulfate to create destructive expansion of the concrete. Also, pozzolans chemically bind free lime and salts that can create efflorescence. Denser concrete, due to pozzolans, holds efflorescence-producing compounds on the inside.

The largest contributor to drying shrinkage in concrete is the loss of water content. The lubricating action of FA and RHA reduces the need for water and therefore also reduces drying shrinkage.

Fly ash is the most commonly known and used artificial pozzolan and results from the burning of pulverized coal in electric power plants. The amorphous glassy spherical particles are the active pozzolanic portion of fly ash. Fly ash is 66-68% glass, on an average.

Though fly ash is typically produced in coal-fired power plants, in reality it doesn't matter at all where the ash comes from, as long as it can produce the benefits listed above. Unfortunately that may not always be true with the kind of ash one would like to use as a pozzolan. For example, coal from the East Coast of the United States tends to contain sulfur, which is still present in the ash or the particles of an ash regardless of its origin, and might be too big or contain too much carbon. In an attempt to classify different qualities of ash, categories have been created for coal-derived fly ash.

Class F fly ash (see ASTM C 618) readily reacts with lime (produced when Portland cement hydrates) and alkalis to form cementitious compounds. In addition to that, Class C fly ash may also exhibit hydraulic (self-cementing) properties.

In combination with Portland cement, Class C fly ash can be used as a cement replacement, ranging from 20-35% of the mass of cementitious material. Class C fly ash must replace at least 25% of the Portland cement to mitigate the effects of alkali silica reaction.

In combination with Portland cement, Class F fly ash can be used as a cement replacement ranging from 20-30% of the mass of cementitious material. As little as 3% of coal in the cement mix (without aggregates) will prevent the hardening of the concrete. On the other hand, 1% doesn't seem to be a problem at all, so the gap is pretty narrow.

If the fly ash has high calcium content, it should not be used in sulfate exposure or hydraulic applications.

Rice Hull Ash (RHA) does not come by nature as a finely divided powder, one of the requirements to be a good pozzolan. Rice hulls are an organic product and they contain carbon. The technology for burning rice hulls has improved a lot, but that doesn't mean that each and every plant that burns these hulls is using the latest technology. Even if they do, the result will not necessarily be a suitable pozzolan. The modern furnaces for rice hulls are probably mostly designed to produce as little NOx emission as possible. For that the hulls would have to be burnt with the minimum possible amount of air (oxygen). That in turn would unfortunately mean that the carbon content measured in [3]LOI[2] (loss on ignition) might be high.

Silica fume (SF) is a waste product of the silicon metal industry, and is a super-fine powder of almost pure amorphous silica. Though difficult (and expensive) to handle, transport and mix, it has become the chosen favorite for very high-strength concretes (such as for high rise buildings), and is often used in combination with both cement and fly ash.

Silica fume is a by-product resulting from the production of silicon or ferrosilicon alloys or other silicon alloys. Silica fume is light or dark gray in color, containing typically more than 90% of amorphous silicon dioxide. Silica fume powder collected from waste gases and without any further treatment is generally called undensified silica fume, to distinguish it from other forms of silica fume.

Undensified silicon fume consists of very fine vitreous spherical particles with an average diameter about 150 nm, whereas the average cement particle has a diameter of about 10 μm. The undensified silica fume is almost as fine as cigarette ash and the bulk density is only about 200-300 kg/m$^3$. The relative density of typical silica fume particles is 2.2 to 2.5. Because the extreme fineness and high silicon content, silica fume is generally a very effective pozzolan.

Though condensed silica fume is much easier to handle and transport, uncondensed silica fume (normally in the form of a slurry) is more effective. The smaller, already wetted particles mix much easier and distribute better, hence reactivity is better.

The chemical composition of SF varies depending on the nature of the manufacturing process from which the SF is collected. The main constituent material in SF is silica ($SiO_2$), the content of which is normally over 90%.

The use of silica fume in concrete usually increases water demand. The increased water demand causes an increase in water to cement ratio and could negate the benefits of adding silica fume. For this reason, silica fume concrete (SFC) normally incorporates a water reducing agent or superplasticiser. SFC is more cohesive than conventional concrete. This is true for SFCs both with and without superplasticiser. Increased cohesiveness reduces the likelihood of bleeding and segregation. This increased cohesiveness could however increase the required compaction energy. Increased cohesiveness of SFC encourages the potentiality of plastic shrinkage and cracking that appears when the bleeding water cannot compensate for the water loss on the surface, due to evaporation. Under conditions of fast evaporation, curing measures are normally taken immediately after placing the concrete. It should be noted that to overcome the above shortcomings, sometimes FA and/or RHA are also added to the concrete, together with SF.

Combining SF with the appropriate aggregates and water-reducing agent can produce high-strength concrete with a cube compressive strength of around 100 Mpa, in extreme cases up to 300 Mpa.

The impermeability of SFC is higher than that of similar concrete without SF. Tests have proven that one part of silica fume can replace up to 3-4 parts of cement without any loss of strength. Replacing 10% by weight of cement with SF is a good starting point for experiments.

Unfortunately, some types of SF cannot be used in concrete. The combination of Si and FeSi—75% condensed silica fume has proven to work effectively, while mixtures of FeSi—75% with FeSi—50% and FeSi—75% with CaSi have proven to be ineffective.

The silica fume particle consists mainly of vitreous silica particles. It has a specific gravity of about 2.20, which happens to be the accepted value for the specific gravity of any vitreous silica. Nevertheless, it has been proven that the higher the amount of impurities in silica fume, the higher the specific value. Certain impurities such as iron, magnesium, and calcium (note: but not CaSi) have shown to increase this value.

SUMMARY

The present invention includes chemical compositions that include colloidal silica for use as admixtures when mixing concrete prior to being poured and finished. The present invention also includes chemical compositions that comprise colloidal silica for application to concrete immediately after it is poured for use as hardening agents and as a means of protecting freshly poured concrete from freeze damage prior to finishing during cold weather.

In one embodiment, colloidal silica can be used as an admixture to concrete mix. In specific embodiments, a colloidal silica solution having a silica solids content of about 3% to about 10%, by weight, may be used at a ratio of about 1 fluid ounce (fl. oz.) (about 30 mL) to about 34 fl. oz. (about 1 L) per sack of concrete mix, to provide for a finishable concrete mix even when there is up to a 90% reduction in the amount of water added to the mix. In embodiments where the concrete mix includes only a small amount of water (e.g., more than a 75% reduction, an 85% reduction, a 90% reduction, etc.), use of colloidal silica as an admixture may be enhanced by vibrating (e.g., with a vibratory screed, etc.) or otherwise manipulating the concrete mix.

In a second embodiment, colloidal silica can be used in a method where it is applied at the rate of about 32 fl. oz. (about 950 mL) per 100 square feet (sq. ft.) (9.3 m$^2$) to freshly poured, but uncured, concrete, to prevent freeze damage in the event the concrete is poured but not timely finished during freezing weather.

Other aspects of the invention, as well as their features and advantages, will become apparent to those in the art through consideration of the ensuing description and the appended claims.

DETAILED DESCRIPTION OF THE INVENTION

Colloidal Silica differs from Silica Fume in having a smaller particle size, a greater surface area, and an increased Pozzolanic Reactivity, as shown in the following chart.

|  | Portland Cement | Silica Fume (Microsilica) | Colloidal Silica |
| --- | --- | --- | --- |
| Particle Size | 1 μm-100 μm (average: ~10 μm) | 150 nm (average) | 2 nm-133 nm (5 nm-40 nm) |
| Specific Surface Area (Blaine Fineness) | 300 m²/kg-500 m²/kg (average: ~370 m²/kg) | 15,000 m²/kg-30,000 m²/kg (average: ~23,000 m²/kg) | (80,000 m²/kg-425,000 m²/kg) |
| Pozzolanic Reactivity Percent (after curing for 28 days at 20° C.) | <20% | ~30% | 88% |

The chemical analysis of the preferred embodiment of colloidal silica used in the concrete mix is as follows:

$SiO_2$—97.5%, $Al_2O_3$—0.18%, CaO—0.07%, $Fe_2O_3$—0.05%, MgO—0.12% $Na_2O$—0.74%, $K_2O$—0.04%, and SO—1.3% (percentages by weight)

Colloidal silica has all of the positive benefits with little or none of the negative issues associated with other pozzolans. It is the smallest in size of any of the pozzolans. It has the highest level of pozzolanic reactivity. It does not suffer the same issues of contamination as fly ash, or rice hull ash. It is spherical by nature, and particle size is not a guess but a precise and consistent size. It's liquid by default so the speed of the reaction is not hindered by being in a flake form. It does not have the issues of the silica fume for water consumption. This is why colloidal silica is being used as a finishing agent on previously hardened, fully cured, concrete. However, colloidal silica has not been used during the actual mixing process in the cement preparation and its benefits in concrete mixing and finishing were previously unknown.

What has been discovered is that mixing colloidal silica in with a batch of concrete results in a superior concrete mix. This results in the ability to work higher slumps with fewer issues. By utilizing colloidal silica during the batch mixing process it is possible to run a drier mix design and finish the concrete slab as if it had a much higher water content. The reduction of water in a slab is well documented from the aspect of the performance of the slab. Specifically, the reduction of water in the concrete slab reduces shrinkage, cracks, and curling. The colloidal silica basically makes water wetter so that a reduced amount of water has the ability to hydrate more Portland cement. Concrete treated with colloidal silica will require 1-2 inches of additional slump to finish with normal workability.

In practice, it has been found that adding at least one and a maximum of seven ounces of colloidal silica per sack of cement to a freshly mixed batch of concrete will produce the optimal results desired, and enable a significant reduction in the amount of water required in the mix.

Experiment 1: At Boise, Id., on Dec. 17, 2013 a batch load of 7 cubic yards of 4.5 sack concrete, which called for a designated water amount of 228.9 gallons of water, was ordered from a concrete mixing plant. The original intent of the experiment was to run tests on applying colloidal silica on curing concrete in very cold temperatures. Upon arrival, only 27.5 gallons of water had been added at the cement mixing plant, thus the cement truck arrived at the pour site with 201.4 gallons of water left out of the standard mix formulation. The reason for the water shortage was weather related, as the Boise area was experiencing an unusual cold snap and the water system at the concrete batch mixing plant had temporarily frozen.

The omission of the standard amount of water to the mixture created a batch of concrete was too dry to finish. The sound of the cement inside the drum of the mixer was similar in nature to gravel, and would not have been finishable. No additional water was added to the concrete batch and instead the concrete batch was further mixed with 2.5 gallons (320 fl. oz.; 9.5 L) of the colloidal silica solution available as Multiquip Slabarmor® from Multiquip, Inc. of Carson, Calif. and CDH-100 from Global Polishing Systems, LLC of Henderson, Nev., which has a silica solids content of about 4.5%, by weight, with the balance mostly water used as a fluid carrier. This translated to the addition of approximately 10 fl. oz. (about 300 mL) of colloidal silica solution per sack of cement. When the material was removed from the truck it had the appearance of dry pack concrete that would be used in vertical formed concrete pour.

After the concrete was poured into a slab, a vibratory screed was used on the damp gravel. Upon use of the vibratory screed, the cream, formed of water and calcium chloride, came to the surface, as it would with normal newly poured concrete, and the surface finished just like regular concrete. A portion of one corner of the slab was not screeded. That portion of the newly poured slab that was screeded was then cured in normal fashion and dried into a normal, hard, cohesive concrete slab. In contrast, the material that was not screeded, but simply poured and left, did not consolidate and the next day was loose gravel.

While the use of a vibratory screed was helpful in consolidating the concrete in a situation where the concrete mix included only about 10% of the normal amount of water and where a relatively small volume of the colloidal silica solution was added to the concrete mix, vibration or other types of manipulation to consolidate the concrete mix may be unnecessary where the extent of water reduction is less drastic and/or where a greater relative volume of colloidal silica solution is added to the concrete mix.

The substitution of the colloidal silica for water in the project resulted in significantly less water needed to mix the concrete. The typical weight of this concrete after finishing would be approximately 30,000 pounds. Substituting the colloidal silica saved approximately 1,600 pounds of water weight, or approximately a 5% weight reduction. Further, the reduction in water appears to have reduced shrinkage and curling in the concrete.

Reducing the steps taken in experiment number 1 to method language results in a method for blending concrete which starts with a determination of a standard volume of water to be added to a given volume of concrete mix to provide the hydrated concrete with a desired slump value; then calculating a substitution volume of an aqueous composition including colloidal silica to be used in place of an eliminated portion of the standard volume of the water, with the substitution volume being less than the volume of the eliminated portion of the standard volume of water, and mixing the substitution volume of the aqueous composition with the concrete mix.

Based upon the parameters of experiment number 1, the range of the amount of standard water that can be eliminated can be as little as a few percent, (2 or 3%) to as high as 100%, given that the colloidal silica is itself in an aqueous solution with water. The substituted volume of the aqueous composition may include about 3% silica solids to about 10%, by weight of the aqueous composition, although aqueous compositions that include other amounts of silicon solids, such as colloidal silica, may also be used with the concrete mix.

Another alternative way of describing the method employed in experiment number 1 would be hydrated concrete mix consisting essentially of about 100 to about 160 parts, by weight of a dry concrete mix with at most about 8%, by weight, of an aqueous composition including about 3% colloidal silica to about 10% colloidal silica, by weight of the aqueous composition.

Experiment 2: A second slab of seven cubic yards of 4.5 sack concrete was poured having the standard amount of water in the design mix later in the day. No colloidal silica was added to the concrete prior to the pour. A colloidal silica solution (e.g., Multiquip Slabarmor®, CDH-100 colloidal silica solution, etc.) was applied to the slab immediately after the concrete was screeded using a vibratory screed. The total application yield of the colloidal silica was 400 square feet per gallon, with 4 applications covering 1,600 square feet. There was insufficient day light remaining on the first day and the intention was to return and properly finish the concrete slab on the following, second day. The high and low temperatures on the two days of pouring and finishing of the this slab of concrete were as follows: 27 degrees F. (high) and 19 degrees F. (low) on the first day, and 26 degrees F. (high) and 21 degrees F. (low) on the second day. The ground was heated to 70 degrees F. to a depth of 6 feet such that the concrete could be poured without freezing. The slab was tented and heated with a propane powered heater to prevent freezing. Sometime during the night after the crew left the pour site the propane heater ran out of fuel and the top few inches of the slab froze. The next morning when the crew returned the top of the slab was frozen solid. The surface was dimpled with clear indications of water frozen in the slab. After the heat was turned back on the slab thawed. Unexpectedly, when the slab thawed it returned to a plastic state and was finished as if nothing had happened to the slab. The edges of the slab were not troweled the same as the field of the slab due to the height of the forms and the dirt outside the slab. The edges of the concrete preformed as expected with a frozen slab. The concrete chipped and flaked into loose gravel with no structural integrity. However, a chain test was unable to find any voids in the surface of the concrete where screeded; voids were expected but not found in the partially frozen, subsequently thawed slab. It appears from the testing that the early application of colloidal silica to a concrete slab leads to a slab that can withstand freezing and subsequent re-heating and perform as concrete poured at a standard temperature.

It is thought that the implications underlying the above described experiments are that the water to cement ratio in mixing concrete can be reduced by adding colloidal silica at the time of mixing the concrete, as opposed to adding the colloidal (or other) silica to the surface of the concrete with the intent of the silica penetrating the concrete and acting as a densifier and/or sealer to protect the surface of the concrete. This results in higher strength in the concrete with less weight, less cracking, checking and curling. Further, the second experiment described above may have significant implications as it may be possible to extend the construction season to 12 months as it eliminates the concern of concrete freezing in low temperatures.

Although the foregoing description contains many specifics, these should not be construed as limiting the scope of the present invention, but merely as providing illustrations of some embodiments. Similarly, other embodiments of the invention may be devised which do not exceed the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall with the meaning and scope of the claims are to be embraced thereby.

What is claimed:

1. A method for mixing concrete, comprising: blending a concrete mix in an under-hydrated state with an aqueous colloidal silica solution having a silica solids content of 3 to 10 wt % in a proportion equal to 150 mL to 400 mL of colloidal silica solution to 43 kg of concrete mix to provide colloidal silica-hydrated concrete; wherein said concrete mix in an under-hydrated state has a water-to-cement weight ratio of less than 0.2; wherein no additional water is added to the colloidal silica-hydrated concrete mixed to finish the mixed concrete.

2. The method for mixing concrete of claim 1, further comprising:
   pouring the colloidal silica-hydrated concrete into a form; and
   consolidating the colloidal silica-hydrated concrete.

3. The method for mixing concrete of claim 2, wherein the step of consolidating the colloidal silica-hydrated concrete further comprises using a screed.

4. The method of claim 1, further comprising: introducing the concrete mix into a drum for transportation.

5. The method of claim 4, wherein blending the concrete mix and the aqueous colloidal silica solution reduces or eliminates a need for completely hydrating the concrete mix during transportation.

6. The method of claim 1, wherein blending is effected as an admixture at a site where the colloidal silica-hydrated concrete is to be installed.

7. The method of claim 6, wherein blending comprises salvaging unworkable concrete.

8. The method of claim 7, wherein blending comprises salvaging unworkable concrete with a collapsed slump.

9. The method of claim 7, wherein blending comprises salvaging unworkable concrete with a slump value of less than 10 mm.

10. The method of claim 1, wherein blending comprises increasing a slump value of concrete.

11. The method of claim 1, wherein blending comprises increasing a slump value of the concrete without substantially increasing a water content of the concrete.

12. The method of claim 1, wherein blending comprises increasing a reaction temperature of concrete.

13. The method of claim 12, wherein blending comprises increasing a reaction temperature of concrete to an extent that enables installation of the concrete at temperatures of about 0° C. or less.

14. A method for improving workability of concrete, comprising: providing an under-hydrated concrete mix; and adding to the under-hydrated concrete mix only an aqueous solution comprising colloidal silica having a solids content of 3 to 10 wt % in a proportion equal to 150 mL to 400 mL of the colloidal silica solution to 43 kg of concrete mix, wherein said under-hydrated concrete mix has a water-to-cement weight ratio of less than 0.2; and wherein no additional water is added to improve the workability of the concrete.

16. The method of claim 14, wherein adding the aqueous solution comprises blending the aqueous solution into the under-hydrated concrete mix.

16. The method of claim 14, wherein adding the aqueous solution comprises applying the aqueous solution to a surface of a concrete structure formed from the under-hydrated concrete mix.

17. A method for mixing concrete, comprising: preparing an under-hydrated concrete mix; blending an aqueous solution with the under-hydrated concrete mix, the aqueous solution comprising water and colloidal silica, the aqueous solution having a solids content of 3 to 10 wt % in a proportion equal to 150 mL to 400 mL of colloidal silica solution to 43 kg of concrete mix to provide hydrated concrete;

wherein said prepared under-hydrated concrete mix has a water-to-cement weight ratio of less than 0.2; wherein the blending consists essentially of blending the aqueous solution with the under-hydrated concrete mix; and wherein no additional water is added to the hydrated concrete.

* * * * *